US006457872B1

United States Patent
Besler

(10) Patent No.: US 6,457,872 B1
(45) Date of Patent: Oct. 1, 2002

(54) OPTICAL WAVEGUIDE PLUG CONNECTOR FOR A MECHANICALLY RELEASABLE CONNECTION BETWEEN AT LEAST ONE OWG CONNECTOR PAIR AND A MATING CONNECTOR

(75) Inventor: Martin Besler, Nuremberg (DE)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/411,693

(22) Filed: Oct. 1, 1999

(30) Foreign Application Priority Data

Oct. 5, 1998 (DE) .......................................... 198 45 854

(51) Int. Cl.[7] .................................................. G02B 6/38
(52) U.S. Cl. .............................. 385/56; 385/53; 385/59; 385/58; 385/134
(58) Field of Search .............................. 385/53, 56, 55, 385/59, 58, 134, 135

(56) References Cited

U.S. PATENT DOCUMENTS 5,016,968 A * 5/1991 Hammond et al. ............ 385/53
5,274,729 A * 12/1993 King et al. .................... 385/53

* cited by examiner

*Primary Examiner*—Audrey Chang
(74) *Attorney, Agent, or Firm*—Perman & Green, LLP

(57) ABSTRACT

OWG plug connector for a mechanically releasable connection between at least one OWG connector pair. The OWG plug connector has a connector having a first housing with at least one first chamber for accommodating a first OWG connector. The first chamber has a hole at one end. A mating connector is provided which is complementary to the connector and has at least one second chamber for accommodating a second OWG connector. At least two opposite walls of the second chamber are designed as latching arms. The two OWG connectors have end pieces bounded by exit faces. The first OWG connector is mounted without play in the first chamber. The exit face of the first OWG connector is arranged in the hole of the first chamber. The second OWG connector is seated with longitudinal play in the second chamber with the latching arms pressing, by means of latching lugs, the second OWG connector against a second stop of the second chamber. When the connector is plugged into the mating connector, the wall of the hole penetrates the second chamber, the second OWG connector is lifted from the stop, the exit face of the second OWG connector penetrates the hole, the two OWG connectors are centered in the hole and a defined gap is provided between the exit faces, which are arranged parallel.

22 Claims, 7 Drawing Sheets

OPTICAL WAVEGUIDE PLUG CONNECTOR FOR A MECHANICALLY RELEASABLE CONNECTION BETWEEN AT LEAST ONE OWG CONNECTOR PAIR AND A MATING CONNECTOR

FIELD OF THE INVENTION

The invention relates to an OWG plug connector for a mechanically releasable connection between at least one OWG connector pair and a mating connector according to Patent claims 1 and 16.

BACKGROUND OF THE INVENTION

Such plug-in systems can be used wherever there are optical signal transmissions. Thus, the transmission of information is effected via OWGs on account of the constantly increasing requirements made of the transmission rate (25 to 50 Mbit/s), for example in modern automobiles.

The printed documents DE 44 12 571 and DE 195 25 739 have disclosed OWG plug connectors which butt directly against an active element, for example a transceiver. This means that the active element is situated in the mating connector. For structural reasons, the OWG connector projects from the OWG plug connector. The OWG plug connector together with active element are usually fitted on the housing exterior of a multimedia device, such as e.g. a CD player, in order to minimize the attenuation between OWG connector and active element.

In this case, it is particularly disadvantageous that the interface between OWG and active element is arranged without any protection outside the device and is particularly susceptible to electromagnetic interference. This solution is unsuitable for the transmission rates required, since the EMC (electromagnetic compatibility) decreases as the transmission rate increases. Furthermore, it is disadvantageous that the OWG presses directly onto the active element, since, in the event of external mechanical influences, such as e.g. vibration, the optical surface may be damaged and attenuation is thus produced at the OWG conductor/active element junction.

Moreover, plug connectors have been disclosed in which the OWG connector butts against the active element and the two are subsequently potted jointly with epoxy resin.

In this case, it is particularly disadvantageous that, on the one hand, the connection between OWG connector and active element is no longer releasable and, on the other hand, as a result of material fatigue, the resin becomes dull, the fibre acquires hairline cracks or the connection tears completely, with the result that the attenuation becomes ever greater over time in the first and second cases and transmission is no longer possible in the third case.

The object of the invention is to specify a plug connector for a mechanically releasable connection between at least one OWG connector pair which, to the largest extent possible, is insensitive to vibration without appreciable attenuation being produced, in the process, in the region of transition from OWG connector to OWG connector.

This object is achieved by means of the features specified in the independent claims.

SUMMARY OF THE INVENTION

The first OWG plug connector has a first housing comprising at least one first chamber which can accommodate a first OWG connector and changes into a hole at one end.

Furthermore, the OWG plug connector comprises a mating connector, which is complementary to the connector and has at least one second chamber into which a second OWG connector can be plugged, at least two opposite walls of the chamber being designed as latching arms. In addition, the OWG plug connector comprises at least two OWG connectors whose end pieces are bounded by exit faces, the first OWG connector being situated without play in the first chamber, with the result that the exit face of the first OWG connector is arranged in the hole. The second OWG connector is situated with longitudinal play in the second chamber, that is to say play in the axial direction of the OWG connector, the latching arms having latching lugs at their free ends towards the side facing the chamber, which latching lugs are bevelled in such a way that they press the OWG connector against the stop of the second chamber. When the connector is plugged into the mating connector, the wall of the hole penetrates the second chamber in such a way that, on the one hand, the second OWG connector is lifted from the stop and, on the other hand, the exit face of the second OWG connector penetrates the hole, with the result that the two OWG connectors are arranged such that they are centred in the hole and a defined gap is produced between the exit faces, which are now arranged parallel.

It is preferable for elastic elements to be provided between the two free ends of the latching arms and the second housing. This ensures that the pressure on the collar of the second OWG connector is high enough to ensure that the size of the gap between OWG connectors is not altered.

In the case of a plug connector having a plurality of OWG cables, the OWG connectors may have lugs operating as codings which guarantee the capability of fitting the respective chambers.

It is preferable for the second OWG connector to be embodied as a "pigtail" for an active element. A "pigtail" is to be understood to mean an optical extension cable for an active element; in this case, the one end can be connected directly to the active element and the other element is preformed with a second OWG connector. This affords the possibility of banishing the active element from the mating connector and arranging it at a suitable location in terms of EMC. The plug connector is now independent of the development of the active element, with the result that the plug connector may survive a number of active element generations, since every new development of the active element may entail a development of a new mechanical interface between active element and OWG.

Furthermore, the optical exit faces of the first OWG connectors are protected mechanically since the latter do not project from the connector.

Furthermore, the subject-matter of the invention includes a mating connector having at least one chamber for accommodating an optical fibre, a stop and elongate latching arms for accommodating an OWG connector.

BRIEF DESCRIPTION OF THE DRAWINGS

Further features and advantages of the invention emerge from the following description of an OWG plug-in system as an example of a preferred configuration of the invention with reference to the schematic drawings, in which.

The structure of the first plug connector 1 is described in detail below.

DETAILED DESCRIPTION OF THE INVENTION

Figure 1:
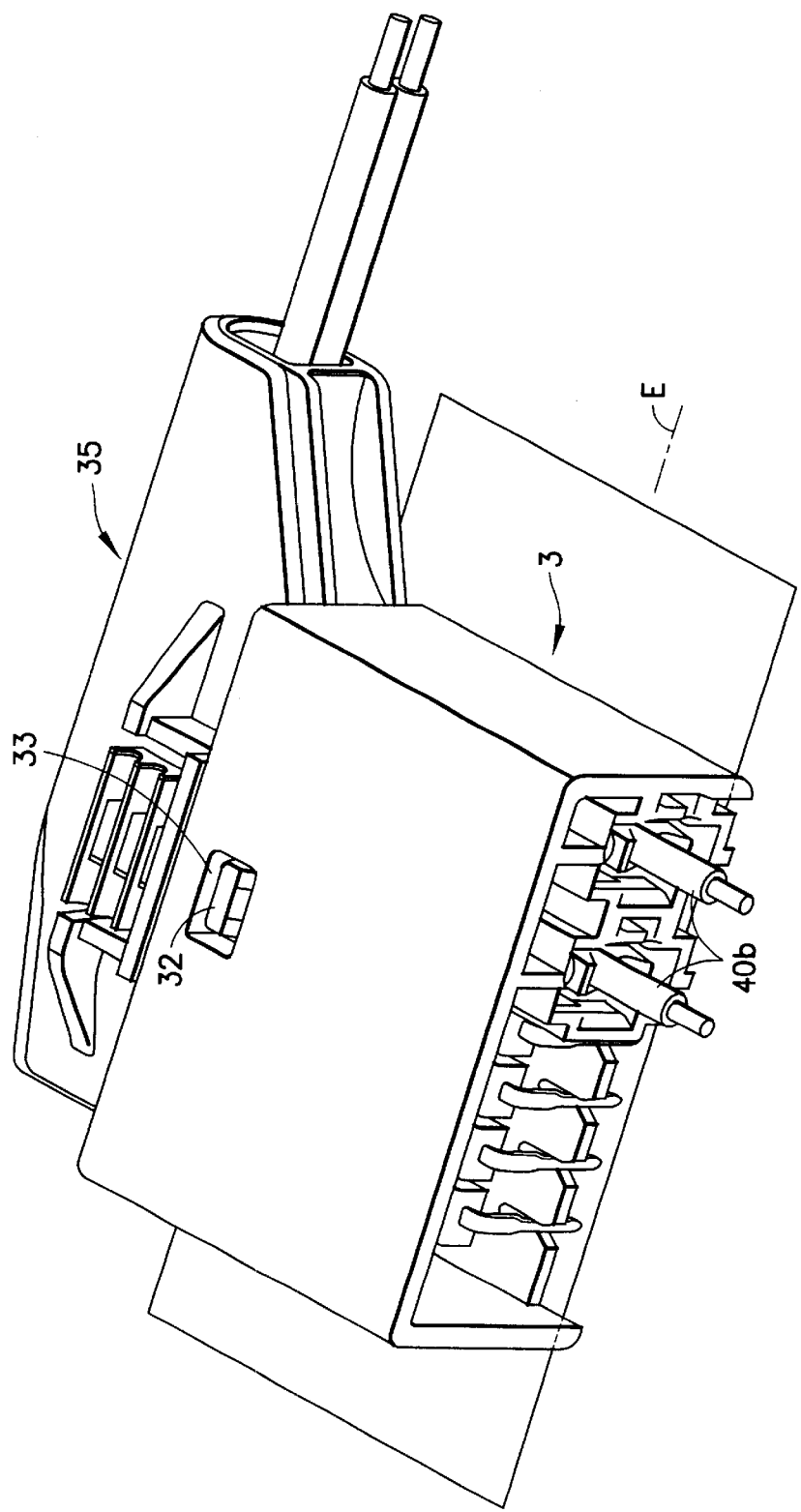
FIG. 1 shows an oblique plan view of a first plug connector in the plugged-in state.
Figure 3:
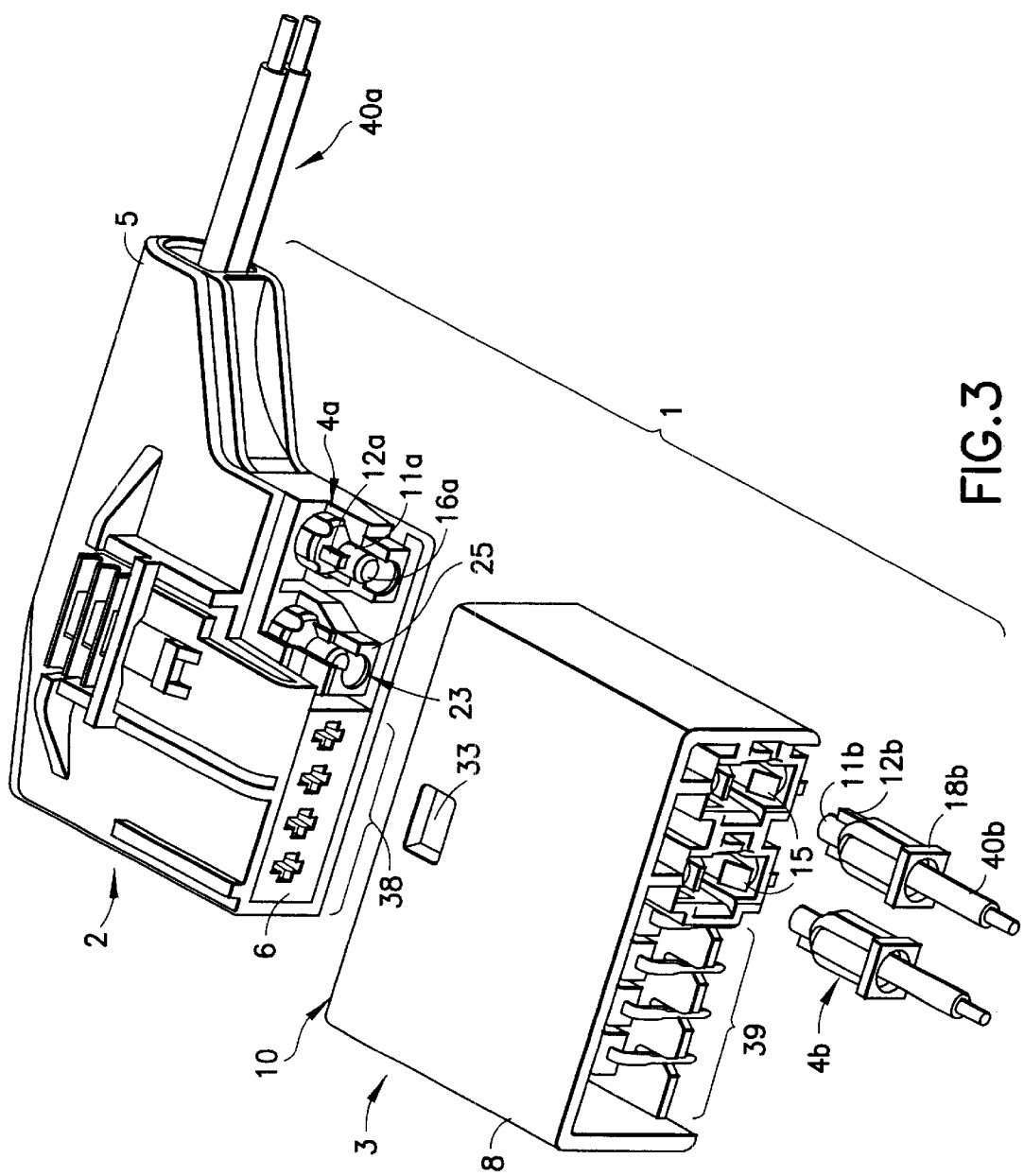
FIG. 3 shows an oblique plan view of a plug connector according to the invention which is in the non-plugged-in state.

The first plug connector 1 can be seen in an oblique plan view in the unplugged-in state in FIG. 3 and in the plugged-in state in FIG. 1. The first plug connector 1 is composed of at least four components, a connector 2, a mating connector 3 and at least two OWG connectors 4a, 4b. The connector 2 is partly cut away in FIG. 3 in order to illustrate its inner structure. The latter essentially has a first housing 6 with an electrical plug-in unit 38 and two first chambers 7, which are preformed with OWG connectors and are readily visible in the cut-out region in FIG. 3, as well as OWG cables 40a associated with the OWG connectors 4a, and a covering cap 5 pushed onto the housing 6.

The mating connector 3 essentially has a second housing 8, one end being provided with an insertion shaft 10, which is necessary for the connector 2. The opposite end of the second housing 8 on the one hand has two second chambers 9 and on the other hand may have an electrical mating plug-in unit 39 matching the electrical plug-in unit 38 and having correspondingly required electrically conductive connections. In FIG. 3, the electrical plug-in unit 38 is provided with four electrical connections. Both the electrical plug-in unit 38 and the electrical mating plug-in unit 39 are not part of the subject-matter of the invention.

The OWG connectors 4a, 4b can be roughly divided into four regions, a cylindrical end piece 11a, 11b, a centre piece (not described in any specific detail), an adjoining collar 18a, 18b with a square cross section, and the OWG cables 40a, 40b. The end piece 11 is bounded by the exit face 16, which is hot-plated, that is to say that this face is absolutely planar, with the result that hardly any attenuation is produced when the "light" exits or enters. As will subsequently become clear, the mating connector 3 must be preformed with the OWG connectors 4b before the connector 2 is guided into the insertion shaft 10 until a latching lug 33 of the connector 2 snaps into a matching latching opening 33 of the mating connector 3, in order to lock the connector and the mating connector together.

It should be noted that all parts of the first OWG connector are provided with the reference symbol "a". Correspondingly, the parts of the second OWG connector are identified by "b". The two OWG connectors 4a, 4b differ only in terms of the coding lugs 12. The latter guarantee the capability of the OWG connectors to fit in the respective chambers.

Figure 5:
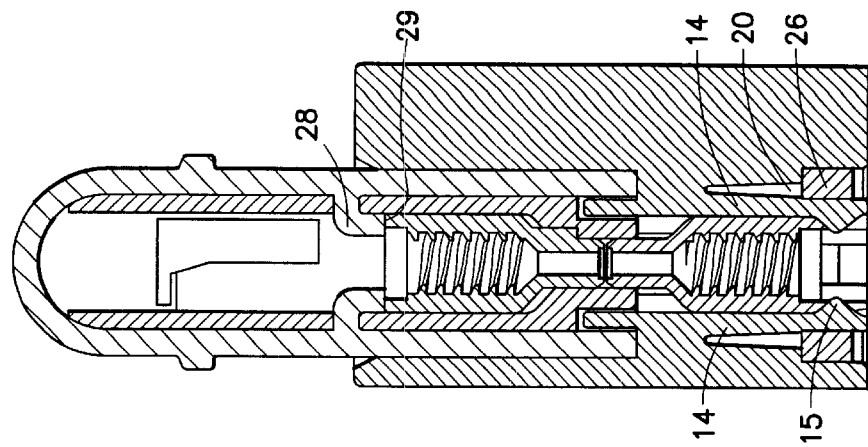
FIG. 5 shows a section along the line A—A of the plug connector from FIG. 4.
Figure 4:
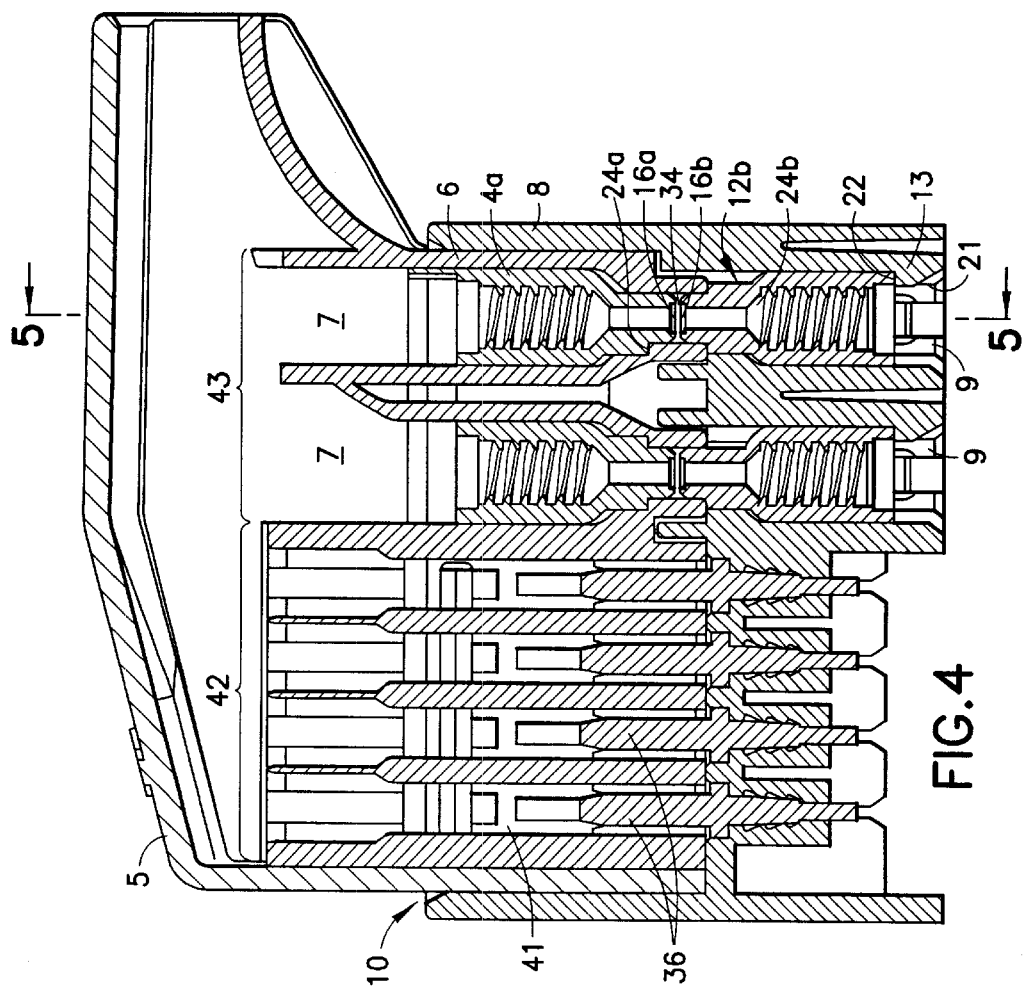
FIG. 4 shows a section along the plane E along the first plug connector from FIG. 1.

FIG. 4 shows a section along the plane E of the plug connector from FIG. 1, FIG. 5 showing a section along the line A—A of the plug connector from FIG. 4. The electrical plug-in unit 42 is readily discernible in the left-hand region of the plug connector. Four chambers, which can each accommodate a female connector (not illustrated), are discernible in the upper region of this unit. In the lower region of the unit, the four female mating connectors 36 are fixedly anchored together with the second housing 8, the contact prongs of the female mating connectors 36 projecting into the chambers 41 provided in the first housing 6. The right-hand portion of the plug connector shows the OWG unit 43. Two first square chambers 7 are discernible in the upper region of this unit, an OWG connector 4a being situated without play in each of the said chambers. In order to provide a better understanding, the OWG cable 40a has not been illustrated as well. The OWG connector 4a on the one hand rests with its lug 12a on the stop 24a and, on the other hand, this connector is secured by the guide rail 28 in the vertical direction, the end face 29 of the guide rail 28 resting on the collar 18a (see FIG. 4). The side areas of the collar 18a and of the centre part are guided by the side walls of the chamber 7. Furthermore, the exit face 16a of the cylindrical end piece 11a projects into the hole 23, the wall 25 of the hole 23 centring this end piece.

Two chambers 9 with a square cross section, which are provided in the housing 8 of the mating connector 3, can likewise be seen in the lower region of the OWG unit. One wall of the chamber is designed as an elastic securing arm 13, the latter having a latching lug whose end 21 is inwardly bevelled, and the rear side 22 of the latching lug running transversely with respect to the plugging direction, with the result that the OWG connector 4b is captively secured in the chamber 9. Two further walls of the chamber 9 are designed as elastic latching arms 14, whose free ends have latching lugs 15 on the side facing the chamber, which latching lugs have, as seen in the plugging direction, a bevelled end 19 and a bevelled rear side 20 in each case (see FIG. 4). In order to strengthen the elastic spring force of the latching arms 14, elastic elements 26 are arranged between the second housing 8 and the free ends of the latching arms. The fourth wall of the chamber 9 is designed as a rigid guide wall.

As already mentioned, the connector 2 is not situated in the insertion shaft 10 during the preforming of the mating connector 3 with OWG connectors 4b. When the OWG connector 4b is pushed into the chamber 9, the latching arms 14 and the securing arm 13 are spread apart until the collar 18b has surmounted the ridge of the latching lugs 15, with the result that the latching arms 14 can snap back and the rear side 22 of the securing arm 13 is situated parallel to the collar area. When the latching arms 14 snap back, the bevelled rear side 20 presses against the collar 18b, with the result that a force acts upwards and holds the OWG connector 4b against the stop 24b. During this operation, the collar area 18b is removed from the rear side 22 of the securing arm 13.

When the connector is inserted into the mating connector 3, the end piece 11b dips into the hole 23 in the connector 2 until the wall 25 of the hole reaches the lug 12b, a defined gap thereby being produced between the exit faces 16a, 16b. As the connector 2 is inserted further, the OWG connector 4b is pressed downwards by the wall 25 counter to the spring forces of the latching arms 14, until the connector 2 latches into place in its final position. It should be noted that the gap 34 is independent of the tolerances of the locking mechanisms, such as e.g. securing arm 13, latching arms 14, etc. The gap is defined only by the spacings between the edge of the lug 12a, 12b and the exit faces 16a, 16b and by the diameter of the hole 23. These dimensions are very small in terms of production engineering, so that the gap hardly varies due to production. As a result, the gap can be chosen to be as small as possible in order to avoid unnecessary attenuation. In addition, the hole 23 ensures that the exit faces are arranged parallel to one another. In interaction with the longitudinal play of the lower OWG connector 4b and the bevelled rear sides 20 of the latching lugs 15, a pressure is produced between the wall 25 of the hole 23 and the lug 12b, a firm fit thereby being ensured for the lower OWG connector 4b.

Figure 6:
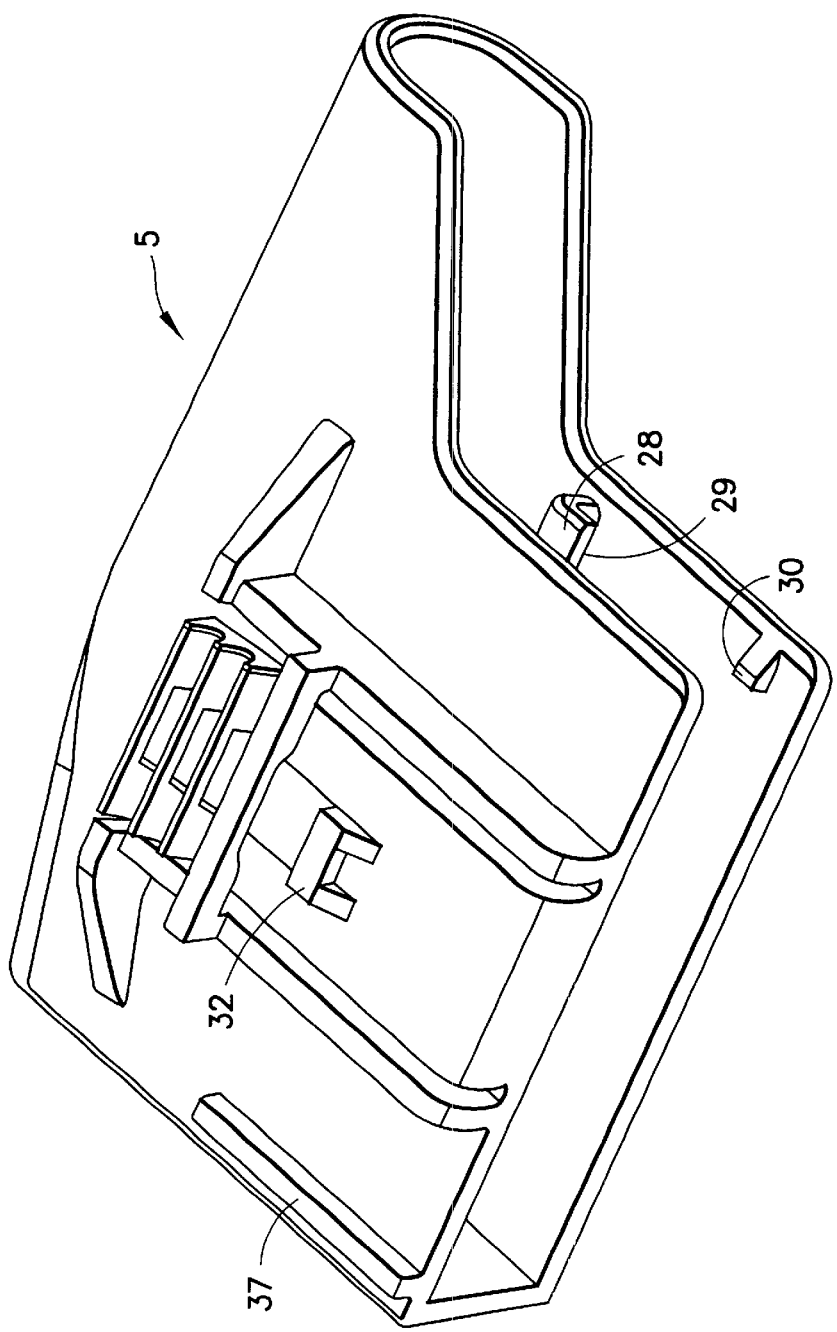
FIG. 6 shows an oblique plan view of the covering cap of the connector.

A covering cap 5 with an annular cable outlet can be seen in an oblique plan view in FIG. 6, the said cable outlet having a shoulder 37 and a latching lug 32 on the outer area along the plug-in device. Inside the covering cap, an L-shaped guide rail 28 is integrally formed transversely with respect to the plugging direction, and so, too is a latching element 30 which is wedge-shaped transversely with respect to the plugging direction.

Figure 7:
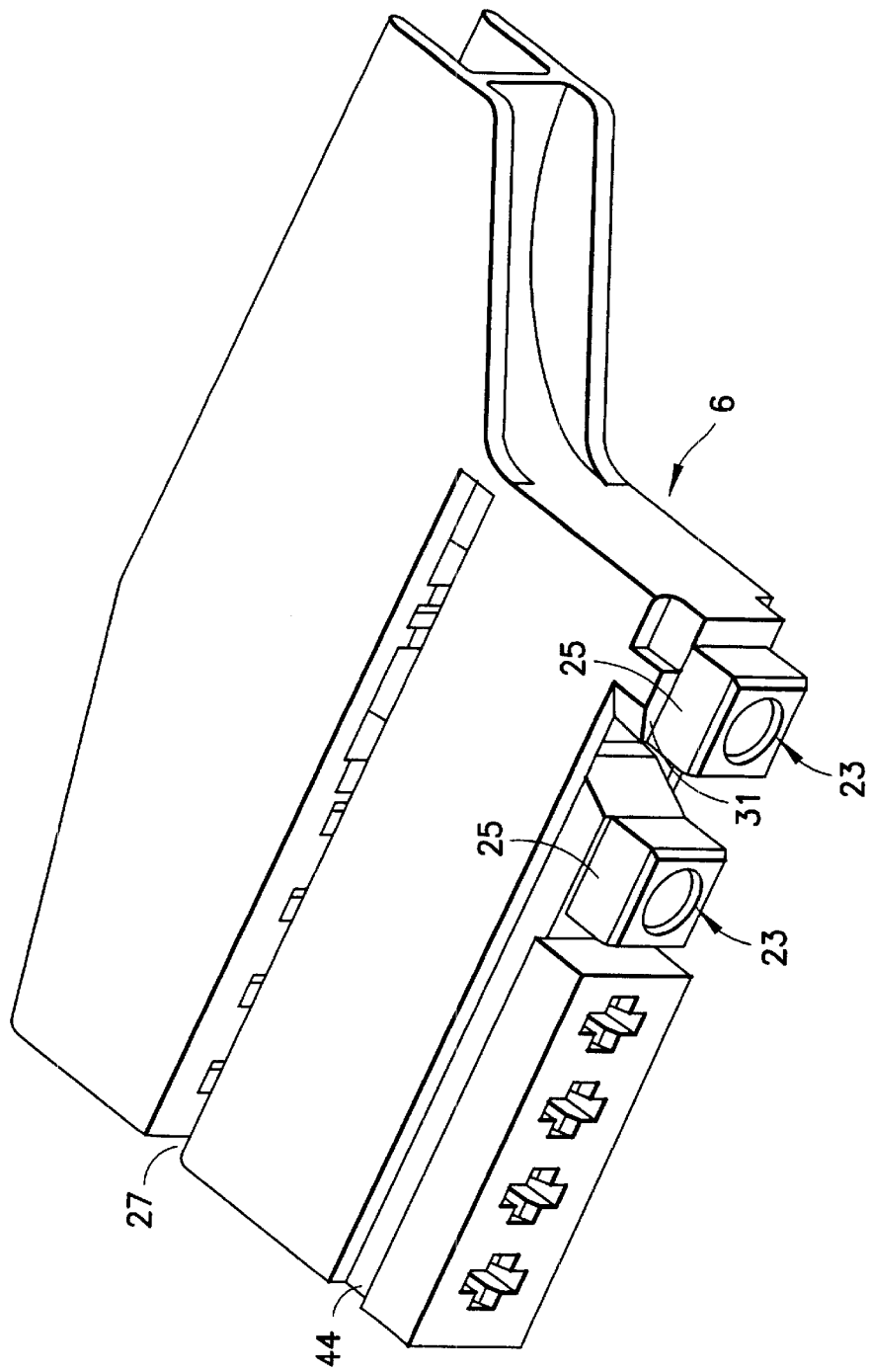
FIG. 7 shows an oblique plan view of the connector housing.

FIG. 7 shows a first housing of the connector 2 in an oblique plan view. On the connector side it is possible to see, on the one hand, the openings of the chambers of the female mating connectors and, on the other hand, the square walls 25 of the hole 23. Behind these elements there is a guide groove 44 on the top side of the housing, which guide groove runs transversely with respect to the plug-in direction and 30 has a wedge-shaped latching element 31. A longitudinal opening 27 which likewise runs transversely with respect to the plugging direction has been made in the top side of the housing.

During the assembly of the connector 2, firstly the chambers 7 have to be occupied by the corresponding OWG connectors 4a together with cables 40a. Only then can the covering sleeve 5 be pushed onto the housing 6, the L-shaped guide rail 28 passing into the longitudinal opening 27, with the result that the end of the L slides along the collar 18a until the latching elements 30 and 31 lock the system.

Figure 2:
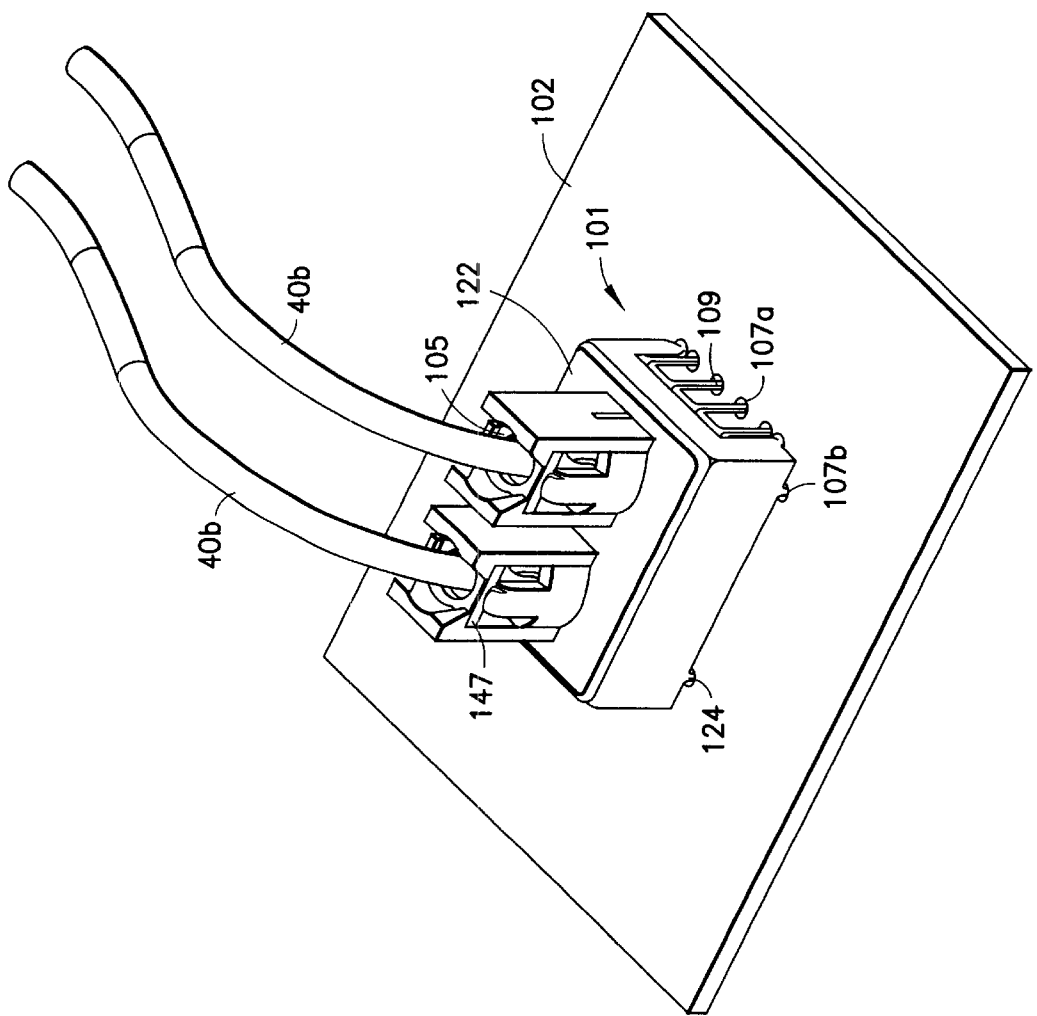
FIG. 2 shows an oblique plan view of a printed circuit board with a second plug connector.

FIG. 2 shows a printed circuit board equipped with an OWG plug connector 101, into which two OWG connectors 105 are plugged. The base region 121 of the plug connector 101 is provided with a screen 122 having connecting pins 124 in order to be electrically connected to the printed circuit board 102. The fact that the screen has a cutout for the connecting pins 109 of the active element on one side area is readily discernible in FIG. 2.

These two plug connectors 101, 1 have made it possible for the externally accessible connections to continue to be arranged on the housing exterior of a multimedia device, and the first plug connector 1, in particular, is provided for this purpose. It has now become possible for an active element 113 which is sensitive to EM interference to be arranged in an EMC region with the aid of the second plug connector. The optical connection between the active element 113 and the OWG connectors 4a is achieved by using a pigtail. As already mentioned, the latter is understood to mean an optical extension cable, the latter having an OWG connector 4b at one end and an OWG connector 105 at the other end. These connectors are simply plugged into their corresponding chambers 9 and 104, respectively.

Figure 8:
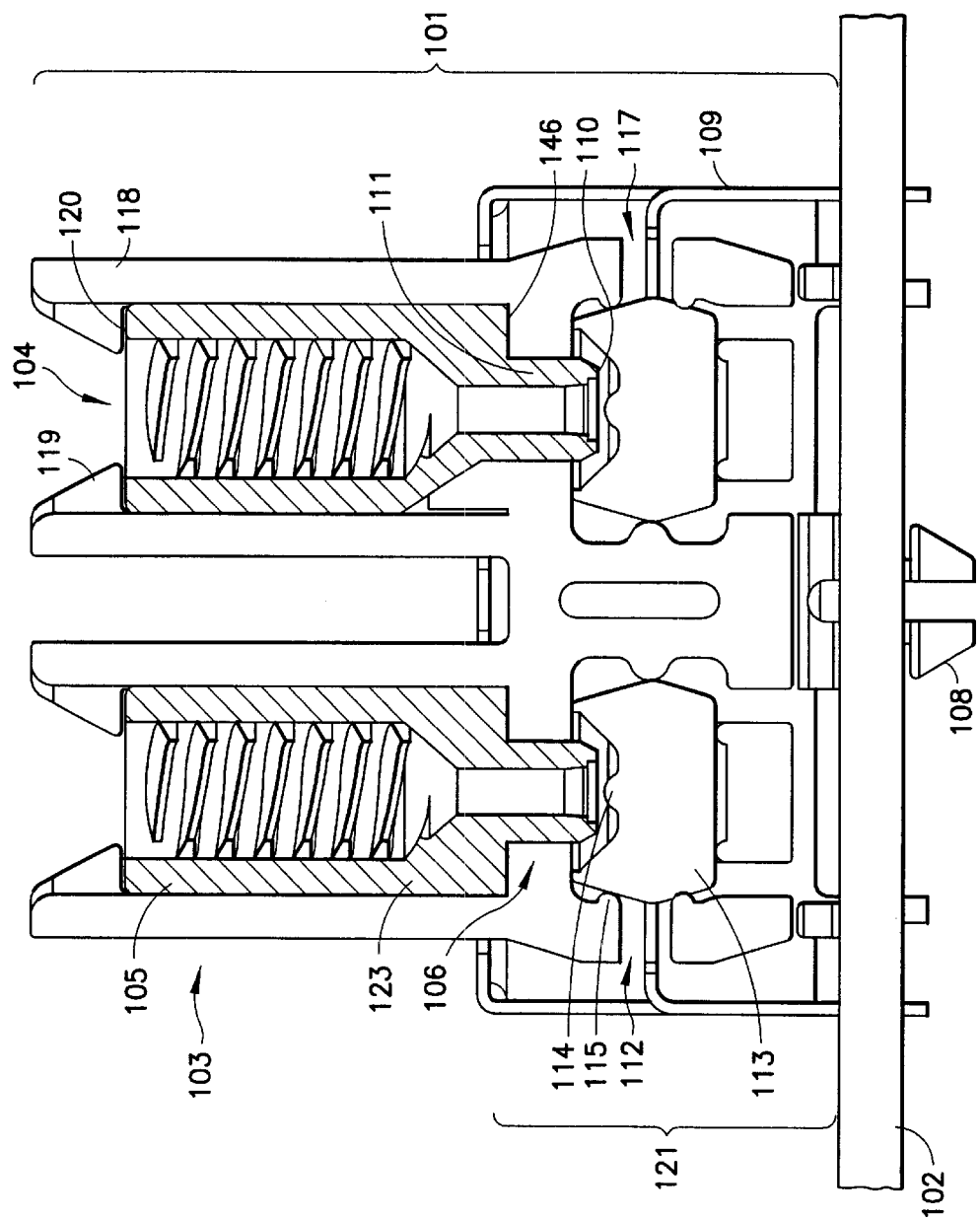
FIG. 8 shows a vertical section through the second plug connector from FIG. 2.

FIG. 8 shows a vertical section through the plug connector 101. The plug connector comprises three parts. Two chambers 104 for accommodating OWG connectors 105 are discernible in the upper region. The walls of the chamber are embodied as elongate latching arms on whose free ends latching lugs are integrally formed, whose ends are bevelled towards the chamber and the rear side runs transversely with respect to the plug-in direction.

Two cavities 112 are discernible in the lower region of the plug connector, the so-called base region 121, elastic centring shoulders being integrally formed on the inner walls of the cavity 112. The said shoulders centre an active element 113 situated in the cavity 112 in such a way that the active region of the active element 113 is situated in the axis of symmetry of the chamber 104. The chambers and the cavities 112 are connected to one another via holes 106.

When an OWG connector 105 is plugged into the chamber 104, the elongate latching arms 108 spread apart until the lug 123 of the OWG connector 105 butts against the stop 146, the latching arms thereby attaining the locking position, the rear side 120 of the latching lug reaching the collar 147 of the OWG connector 105. As the OWG connector 105 is inserted, the end piece 111 penetrates the hole, the end piece 111 projecting into the cavity 112 in the locking position, a defined spacing being produced between the active region of the active element 113 and the exit face 110. This spacing should be minimized, it being necessary to ensure that the active region and the exit face cannot touch one another under any circumstances.

It should be noted that the spacing is independent of the tolerances of the locking mechanisms. The spacing is defined only by the spacings between the edge of the lug 123 of the exit face 110, and the diameter of the hole 106. These dimensions are very small in terms of production engineering, so that the spacing hardly varies due to production. As a result, the spacing can be chosen to be as small as possible in order to avoid unnecessary attenuation.

Furthermore, the outwardly directed walls of the cavity have a perforation 117, which enables the connecting pins 109 of the active element 113 to be routed outwards. The lower region of the plug connector 101 has the printed circuit board 102, which has continuous openings 107a, 107b. The connecting pins 109 of the active element 113 and the connecting pins 124 of the screen 112 are led through the said openings. Furthermore, the latching feet 108 of the housing 103 are led through the opening 107b in order to fixedly connect the plug connector 101 to the printed circuit board 102.

What is claimed is:

1. OWG plug connector for a mechanically releasable connection between at least one OWG connector pair, having a connector (2) which has a first housing (6) with at least one first chamber (7) for accommodating a first OWG connector (4a), the first chamber having a hole (23) at one end;

a mating connector (3), which is complementary to the connector (2) and has at least one second chamber (9) for accommodating a second OWG connector (4b), at least two opposite walls of the second chamber (9) being designed as latching arms (14); and the two OWG connectors (4a, 4b) having end pieces (11a, 11b) being bounded by exit faces (16a, 16b), characterized in that the first OWG connector (4a) is mounted without play in the first chamber (7) with the exit face (16a) of the first OWG connector (4a) arranged in the hole (23), in that the second OWG connector (4b) is seated with longitudinal play in the second chamber (9) and the latching arms (14) press, by means of latching lugs (15), the second OWG connector (4b) against a second stop (24b) of the second chamber (9), and in that when the connector (2) is plugged into the mating connector (3), the wall (25) of the hole (23) penetrates the second chamber (9), the second OWG connector (4b) is lifted from the stop (24b), the exit face (16b) of the second OWG connector (4b) penetrates the hole (23), the two OWG connectors (4a, 4b) are centred in the hole (23) and a defined gap (34) is provided between the exit faces (16a, 16b), which are arranged parallel.

2. OWG plug connector according to claim 1, characterized in that elastic elements (26) are arranged between a second housing (8) and the free ends of the latching arms (14).

3. OWG plug connector according to claim 2, characterized in that the elastic elements (26) are made of silicone rubber.

4. OWG plug connector according to claim 1, characterized in that the first and the second chamber (7, 9) have a square cross section having walls, at least one wall of the second chamber being designed as a securing arm (13).

5. OWG plug connector according to claim 4, characterized in that the securing arm (13) has a latching lug at its free end on the side facing the chamber, which latching lug has a bevelled end (21) and a rear side (22) running transversely with respect to the plugging direction.

6. OWG plug connector according to claim 5, characterized in that the latching lug (15) has, as seen in the plugging direction, a bevelled end (19) and a bevelled rear side (20), the rear side (20) pressing against a collar (18b) of the second plugged-in OWG connector (4b).

7. OWG plug connector according to claim 6, characterized in that the mating connector (3) is suitable for equipping a printed circuit board.

8. OWG plug connector according to claim 1, characterized in that each of the end pieces (11a, 11b) are cylindrical, having at least one lug (12a, 12b) being integrally formed on the circumference of the end piece (11a, 11b) in a manner spaced apart from the exit face (16a, 16b).

9. OWG plug connector according to claim 8, characterized in that the first housing (6) has at least one longitudinal opening (27) running transversely with respect to the plugging direction and in that the plug connector has a covering cup (5)—which fits the first housing (6)—with at least one guide rail (28), which runs transversely with respect to the plugging direction, is aligned with the longitudinal opening (27) and is formed in such a way that, in the covered state, the lug (12a) of the first OWG connector (4a) bears on a first stop (24a) of the first chamber (7).

10. OWG plug connector according to claim 9, characterized in that the guide rail (28) is L-shaped and an end face (29) of the L bears on a collar (18a) of the first OWG connector (4a) in the covered state of the mating connector (3).

11. OWG plug connector according to claim 9, characterized in that the first housing (6) and the covering cap (5) have latching elements (30, 31) in order to lock the two together in the covered state.

12. OWG plug connector according to claim 9, characterized in that the covering cap (5) has a latching lug (32), and in that the mating connector (3) has a second housing (8) with an opening (33), which matches the latching lug (32), in order to lock the plug connector between connector (2) and mating connector (3) in the plugged-in state.

13. OWG plug connector according to claim 1, characterized in that the connector (2) has an angular cable outlet (35).

14. OWG plug connector according to claim 1, characterized in that the first housing (6) and the second housing (8) have at least one female connector and one female mating connector (36) for an electrical connection.

15. OWG plug connector according to claim 1, characterized in that, along the plugging direction, the connector (2) has a shoulder (37) as an element that prevents transposition of mating connector (3).

16. Mating connector (3) having at least one chamber for accommodating an optical fibre, characterized by a stop (24b) and by elongate matching latching arms (14) for accommodating an OWG connector (4b), wherein the OWG connector (4b) is pressed in the direction of the stop (24b) by the latching arms, and wherein the OWG connector (4b) is lifted away from the stop 24(b) when another connector (2) is mated with the mating connector (3).

17. An OWG plug connector for a mechanically releasable connection between at least one OWG connector pair, the at least one connector pair including a first OWG connector having a first exit face, and a second OWG connector having a second exit face and at least one lug, the OWG plug connector comprising:

a connector having a first housing, the first housing having at least one first chamber for receiving the first OWG connector, the first chamber having a hole at one end in which the first exit face is arranged when the first OWG connector is located in the at least one first chamber, the hole having a wall; and a mating connector complementary to the connector, the mating connector having a second housing, the second housing having at least one second chamber for accommodating the second OWG connector, the second chamber having at least two opposite walls with resiliently flexible latching arms having latching lugs, the latching lugs pressing on and biasing the second OWG connector in a plugging direction when the second OWG connector is seated in the second chamber;

wherein, when the connector is plugged into the mating connector, the second exit face of the second OWG connector enters the hole until the wall of the hole contacts the lug of the second OWG connector, the wall urging the second OWG connector against bias from the latching lugs to maintain a gap between the first exit face and second exit face.

18. The OWG plug connector according to claim 17, further comprising elastic elements arranged between the second housing and free ends of the latching arms.

19. The OWG plug connector according to claim 18, wherein the elastic elements are made of silicone rubber.

20. The OWG plug connector according to claim 17, wherein the first and second chamber have a square cross section having walls, at least one wall of the second chamber being designed as a securing arm.

21. The OWG plug connector according to claim 20, wherein the securing arm has a securing lug at its free end on the side facing the chamber, and wherein the securing lug has a beveled end and a rear side running transversely with respect to the plugging direction.

22. The OWG plug connector according to claim 17, characterized in that the latching lug has, as seen in the plugging direction, a beveled end and a beveled rear side, the rear side pressing against a collar of the second OWG connector.

* * * * *